(12) United States Patent
Freeman

(10) Patent No.: US 11,436,340 B2
(45) Date of Patent: Sep. 6, 2022

(54) ENCRYPTED DEVICE IDENTIFICATION STREAM GENERATOR FOR SECURE INTERACTION AUTHENTICATION

(71) Applicant: BANK OF AMERICA CORPORATION, Charlotte, NC (US)

(72) Inventor: Ion Chalmers Freeman, Brooklyn, NY (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 664 days.

(21) Appl. No.: 16/449,652

(22) Filed: Jun. 24, 2019

(65) Prior Publication Data

US 2020/0401705 A1 Dec. 24, 2020

(51) Int. Cl.
*G06F 21/60* (2013.01)
*G06F 7/58* (2006.01)
*G06N 20/00* (2019.01)
*H04L 65/70* (2022.01)

(52) U.S. Cl.
CPC ............ *G06F 21/602* (2013.01); *G06F 7/588* (2013.01); *G06N 20/00* (2019.01); *H04L 65/70* (2022.05); *G06F 2221/2137* (2013.01)

(58) Field of Classification Search
CPC ....... G06F 21/602; G06F 7/588; G06N 20/00; H04L 65/607
See application file for complete search history.

(56) References Cited

U.S. PATENT DOCUMENTS

| | | |
|---|---|---|
| 7,227,950 B2 | 6/2007 | Faith et al. |
| 7,929,700 B2 | 4/2011 | Lodewyck et al. |
| 8,897,449 B1 | 11/2014 | Broadbent |
| 9,083,526 B2 | 7/2015 | Gentry |
| 9,246,602 B2 | 1/2016 | Ukita et al. |
| 9,306,738 B2 | 4/2016 | Loftus et al. |

(Continued)

OTHER PUBLICATIONS

Schuster et al., (Beauty and the Burst: Remote Identification of Encrypted Video Streams, 26th USENIX Security Symposium, Aug. 16-18, 2017, 19 pages) (Year: 2017).*

(Continued)

*Primary Examiner* — Oleg Korsak
(74) *Attorney, Agent, or Firm* — Moore & Van Allen PLLC; R. W. McCord Rayburn

(57) ABSTRACT

A system for authenticating an encrypted device identity is provided. The system comprises a memory device with computer-readable program code stored thereon; a communication device connected to a network; and a processing device, wherein the processing device is configured to execute the computer-readable program code to: receive an encrypted device identification of a user device, the encrypted device identification comprising a stream of generated data; identify a unique stream pattern of the encrypted device identification, wherein the unique stream pattern is a distinguishable characteristic in the stream generated data; store the unique stream pattern; receive an interaction request comprising a provided device identification; analyze the provided device identification to determine if the provided device identification has the unique stream pattern; and based on determining that the provided device identification has the unique stream pattern, authenticate the interaction request.

20 Claims, 6 Drawing Sheets

(56) References Cited

U.S. PATENT DOCUMENTS

| | | | |
|---|---|---|---|
| 9,716,590 B2 | 7/2017 | Gentry | |
| 10,027,475 B2 | 7/2018 | Rietman et al. | |
| 10,211,975 B2 | 2/2019 | Loftus et al. | |
| 2004/0088578 A1* | 5/2004 | Chao | H04L 63/205 |
| | | | 726/6 |
| 2008/0046993 A1* | 2/2008 | Mullick | H04L 63/20 |
| | | | 726/15 |
| 2008/0072303 A1* | 3/2008 | Syed | H04L 63/0807 |
| | | | 726/10 |
| 2009/0125997 A1* | 5/2009 | Cook | G06F 21/34 |
| | | | 726/6 |
| 2015/0312041 A1* | 10/2015 | Choi | G06F 21/33 |
| | | | 713/175 |
| 2019/0007197 A1 | 1/2019 | Laine et al. | |
| 2019/0097792 A1 | 3/2019 | Howe et al. | |

OTHER PUBLICATIONS

Perez et al., (Fatal Attraction: Identifying Mobile Devices Through Electromagnetic Emissions, WiSec '19, May 15-17, 2019, 11 pages) (Year: 2019).*

* cited by examiner

ENCRYPTED DEVICE IDENTIFICATION STREAM GENERATOR FOR SECURE INTERACTION AUTHENTICATION

BACKGROUND

Device identity impersonation is a prevalent form of unauthorized access that is commonly used for misappropriation. While current systems and devices employ authentication techniques (e.g., private-public keys) to discourage unauthorized access, application of new technologies, such as quantum computing, can render traditional authentication methods susceptible to unwanted intrusion by an unauthorized user. Therefore, there exists a need for an improved system for generating nonreproducible device identification that may be leveraged to reliably authenticate a device identity during an interaction and is resistant to modern techniques for unauthorized access.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for authenticating an encrypted device identity. The system comprises: a memory device with computer-readable program code stored thereon; a communication device connected to a network; and a processing device, wherein the processing device is configured to execute the computer-readable program code to: receive an encrypted device identification of a user device, the encrypted device identification comprising a stream of generated data; identify a unique stream pattern of the encrypted device identification, wherein the unique stream pattern is a distinguishable characteristic of the stream of generated data; store the unique stream pattern; receive an interaction request comprising a provided device identification; analyze the provided device identification to determine if the provided device identification has the unique stream pattern; and based on determining that the provided device identification has the unique stream pattern, authenticate the interaction request.

In a specific embodiment, the user device is a first user device, and the processing device is further configured to execute the computer-readable program code to distribute an identification of the unique stream pattern to a second user device, wherein the second user device is configured to authenticate the interaction request based on the identification of the unique stream pattern. In another embodiment, distributing the identification of the unique stream pattern further comprises training the second user device to identify the unique stream pattern.

In yet another embodiment, storing the unique stream pattern of the encrypted device identification further comprises training a machine learning model to identify the unique stream pattern. In yet another embodiment, training the machine learning model comprises leveraging transfer learning techniques to reuse and retrain a preexisting machine learning model.

In yet another embodiment, the user device comprises a random number generator installed on the user device, the random number generator being configured for generating the stream of generated data. In yet another embodiment, the processing device is further configured to execute the computer-readable program code to install the random number generator on the user device. In yet another embodiment, the stream of generated data is time-dependent. In yet another embodiment, the encrypted device identification comprises a signature electromagnetic radiation emission emitted by the user device.

A computer program product for authenticating an encrypted device identity is also provided. The computer program product comprises a non-transitory computer-readable medium comprising computer-readable instructions, the computer-readable instructions, when executed by a processing device, cause the processing device to: receive an encrypted device identification of a user device, the encrypted device identification comprising a stream of generated data; identify a unique stream pattern of the encrypted device identification, wherein the unique stream pattern is a distinguishable characteristic of the stream of generated data; store the unique stream pattern; receive an interaction request comprising a provided device identification; analyze the provided device identification to determine if the provided device identification has the unique stream pattern; and based on determining that the provided device identification has the unique stream pattern, authenticate the interaction request.

In a specific embodiment, the user device is a first user device, and the computer-readable instructions, when executed by the processing device, further cause the processing device to distribute an identification of the unique stream pattern to a second user device, wherein the second user device is configured to authenticate the interaction request based on the identification of the unique stream pattern. In another embodiment, distributing the identification of the unique stream pattern further comprises training the second user device to identify the unique stream pattern.

In yet another embodiment, storing the unique stream pattern of the encrypted device identification further comprises training a machine learning model to identify the unique stream pattern. In yet another embodiment, training the machine learning model comprises leveraging transfer learning techniques to reuse and retrain a preexisting machine learning model.

In yet another embodiment, the user device comprises a random number generator installed on the user device, the random number generator being configured for generating the stream of generated data. In yet another embodiment, the computer-readable instructions, when executed by the processing device, further cause the processing device to install the random number generator on the user device. In yet another embodiment, the stream of generated data is time-dependent. In yet another embodiment, the encrypted device identification comprises a signature electromagnetic radiation emission emitted by the user device.

A computer-implemented method for authenticating an encrypted device identity is also provided. The computer-implemented method comprises: receiving an encrypted device identification of a user device, the encrypted device identification comprising a stream of generated data; identifying a unique stream pattern of the encrypted device identification, wherein the unique stream pattern is a distinguishable characteristic of the stream of generated data; storing the unique stream pattern; receiving an interaction request comprising a provided device identification; analyzing the provided device identification to determine if the provided device identification has the unique stream pattern; and based on determining that the provided device identification has the unique stream pattern, authenticating the interaction request.

In a specific embodiment, the user device is a first user device, and the computer-implemented method further comprises distributing an identification of the unique stream pattern to a second user device, wherein the second user device is configured to authenticate the interaction request based on the identification of the unique stream pattern.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
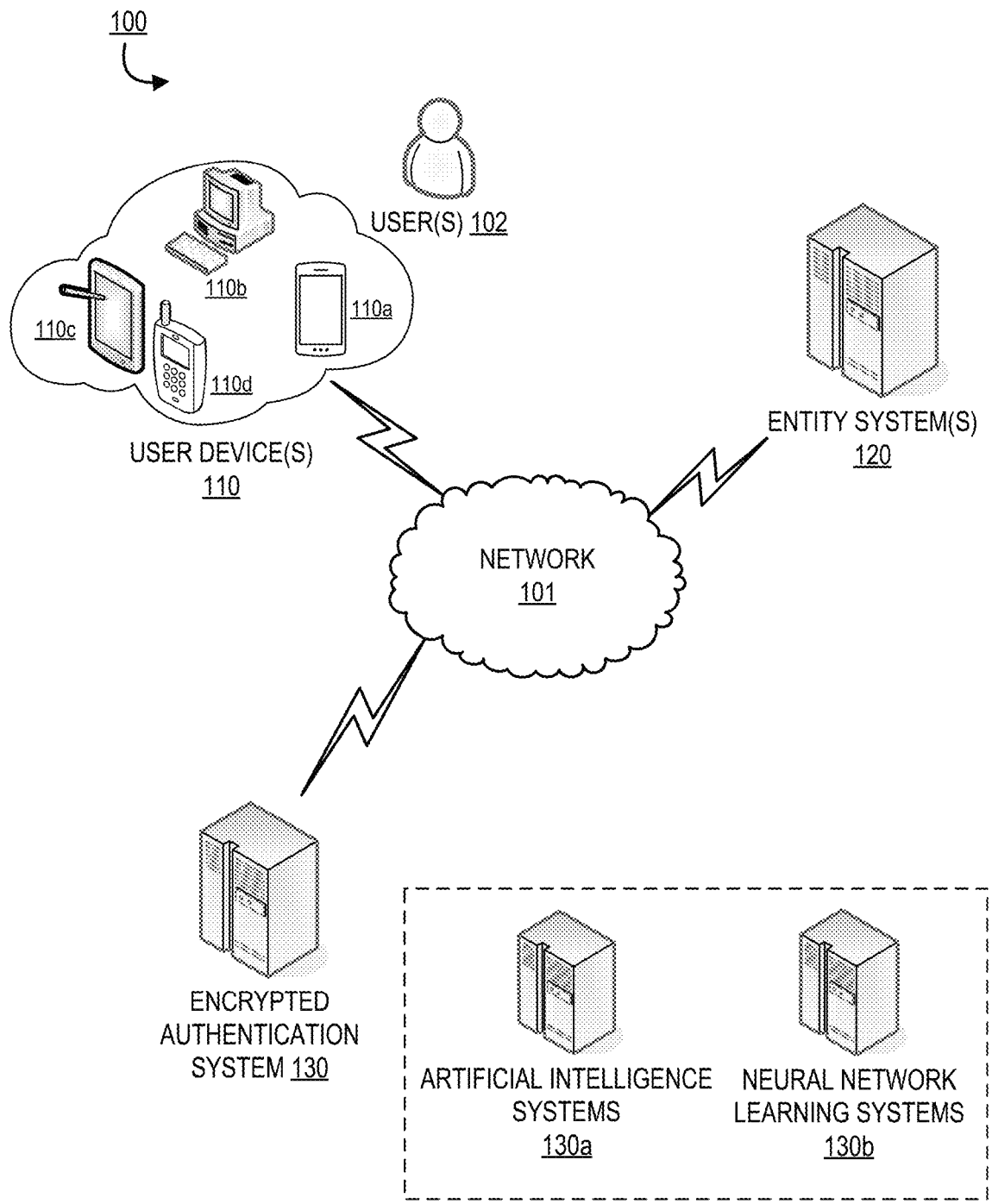
Figure 2:
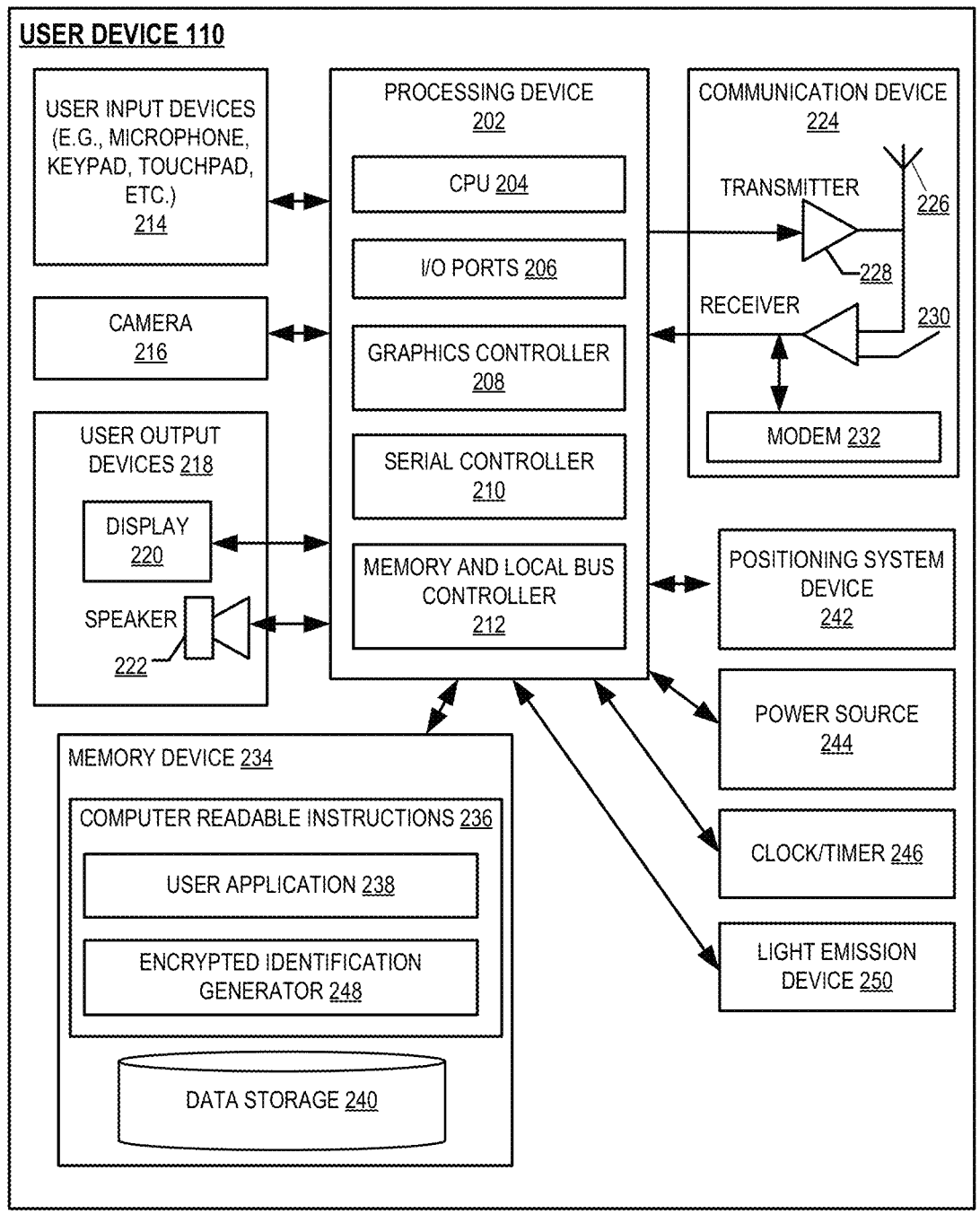
Figure 3:
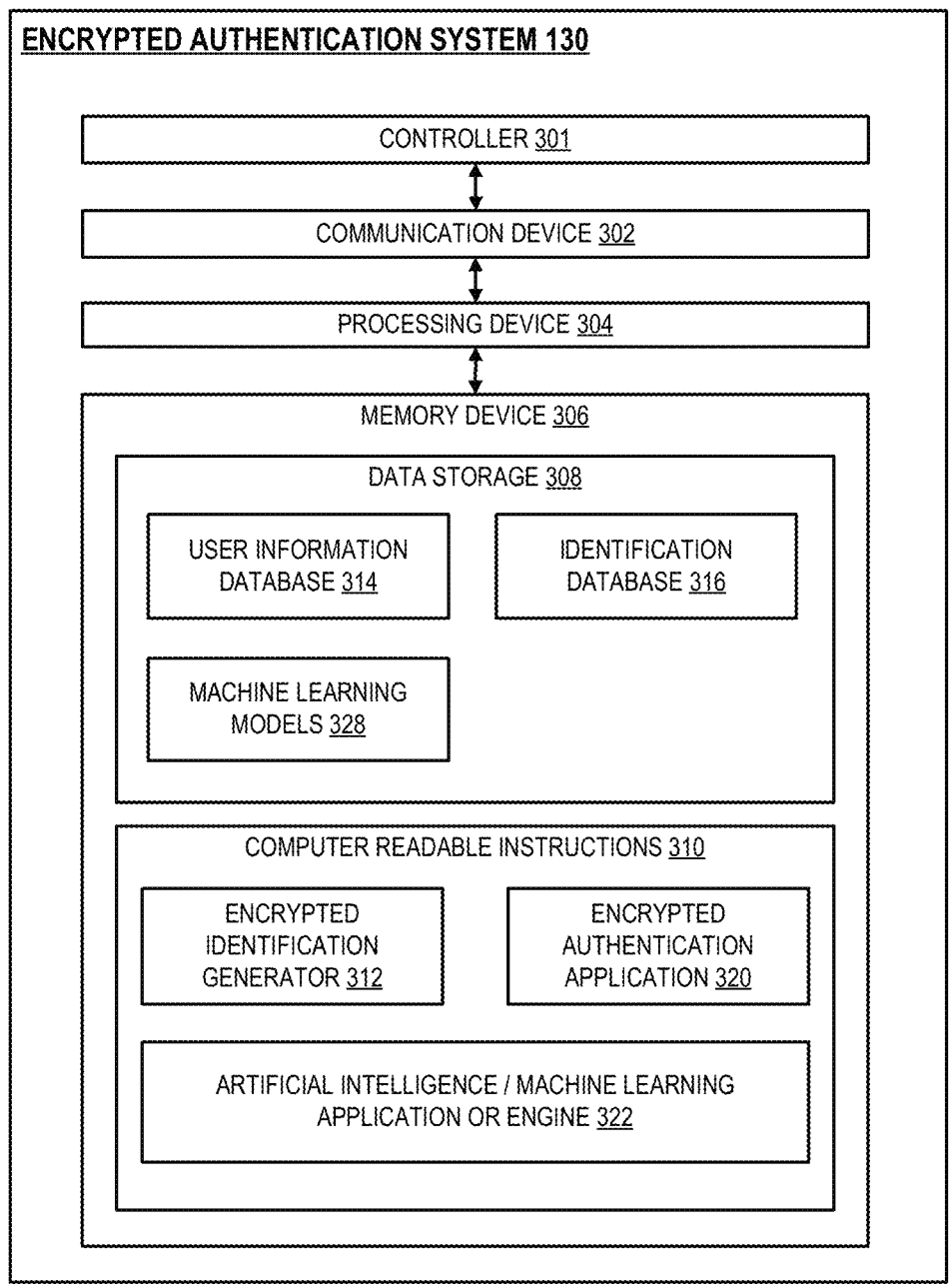
Figure 4:
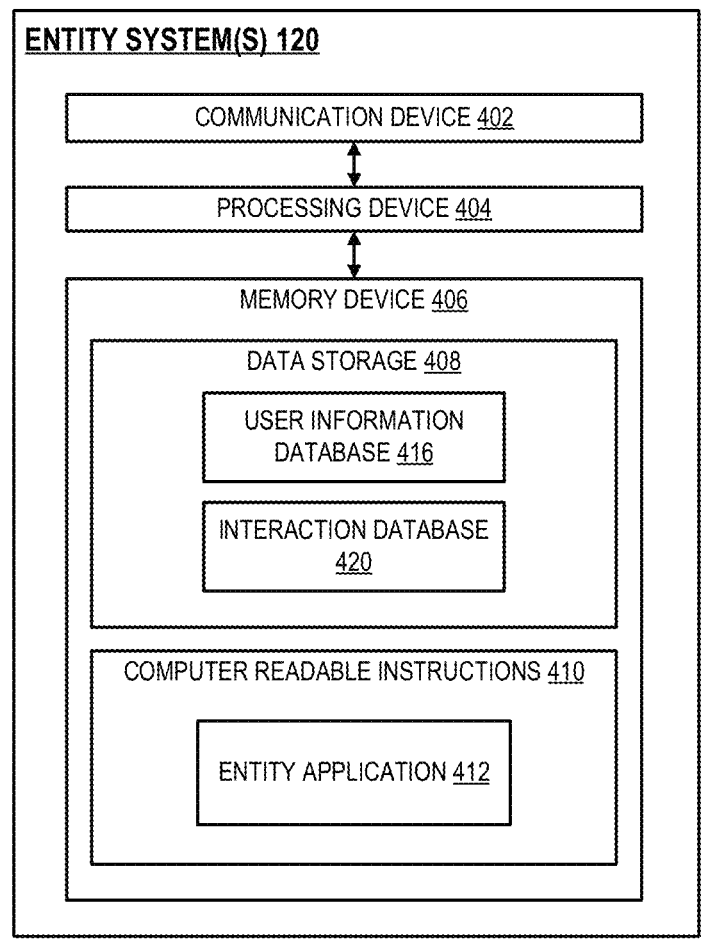
Figure 5:
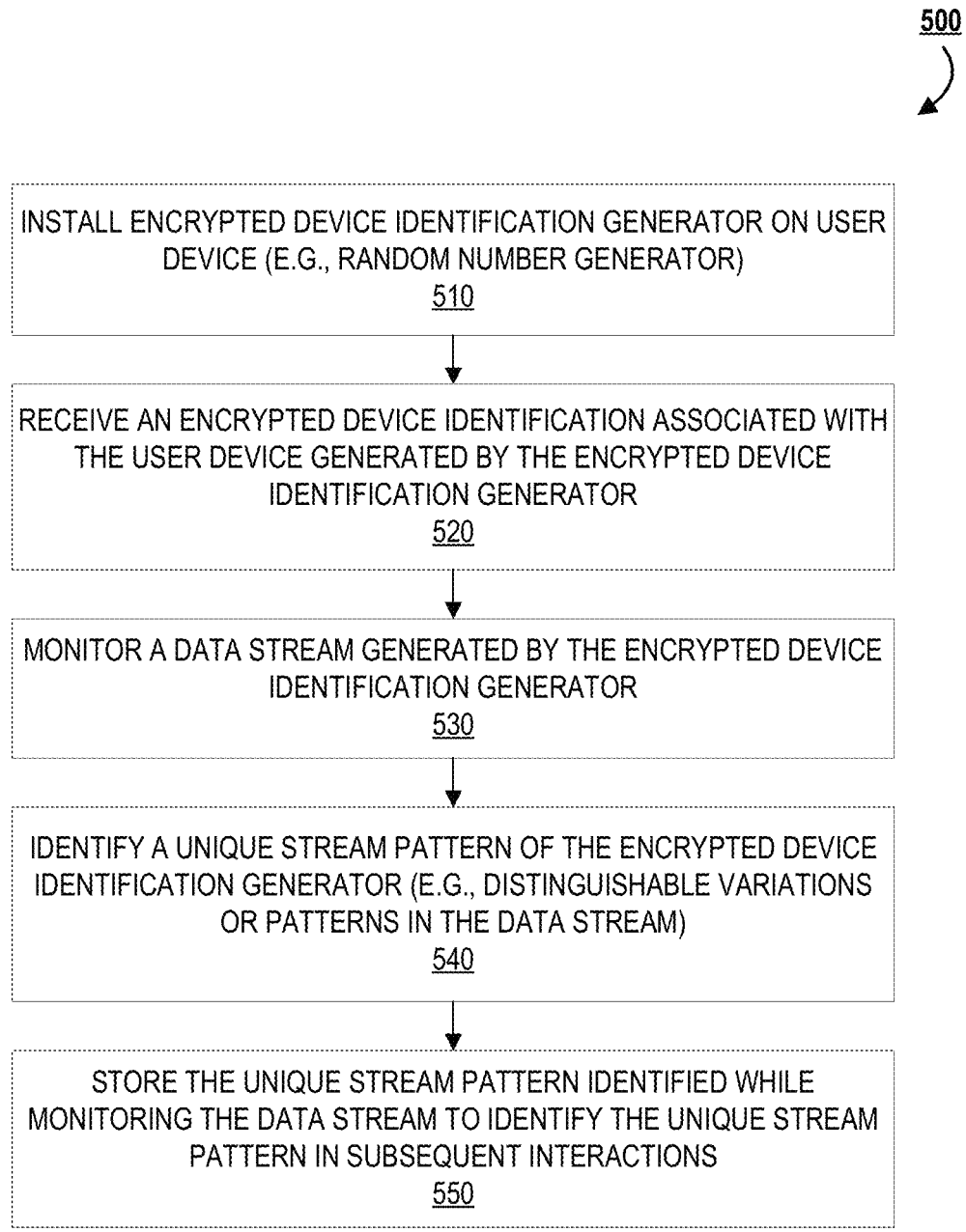
Figure 6:
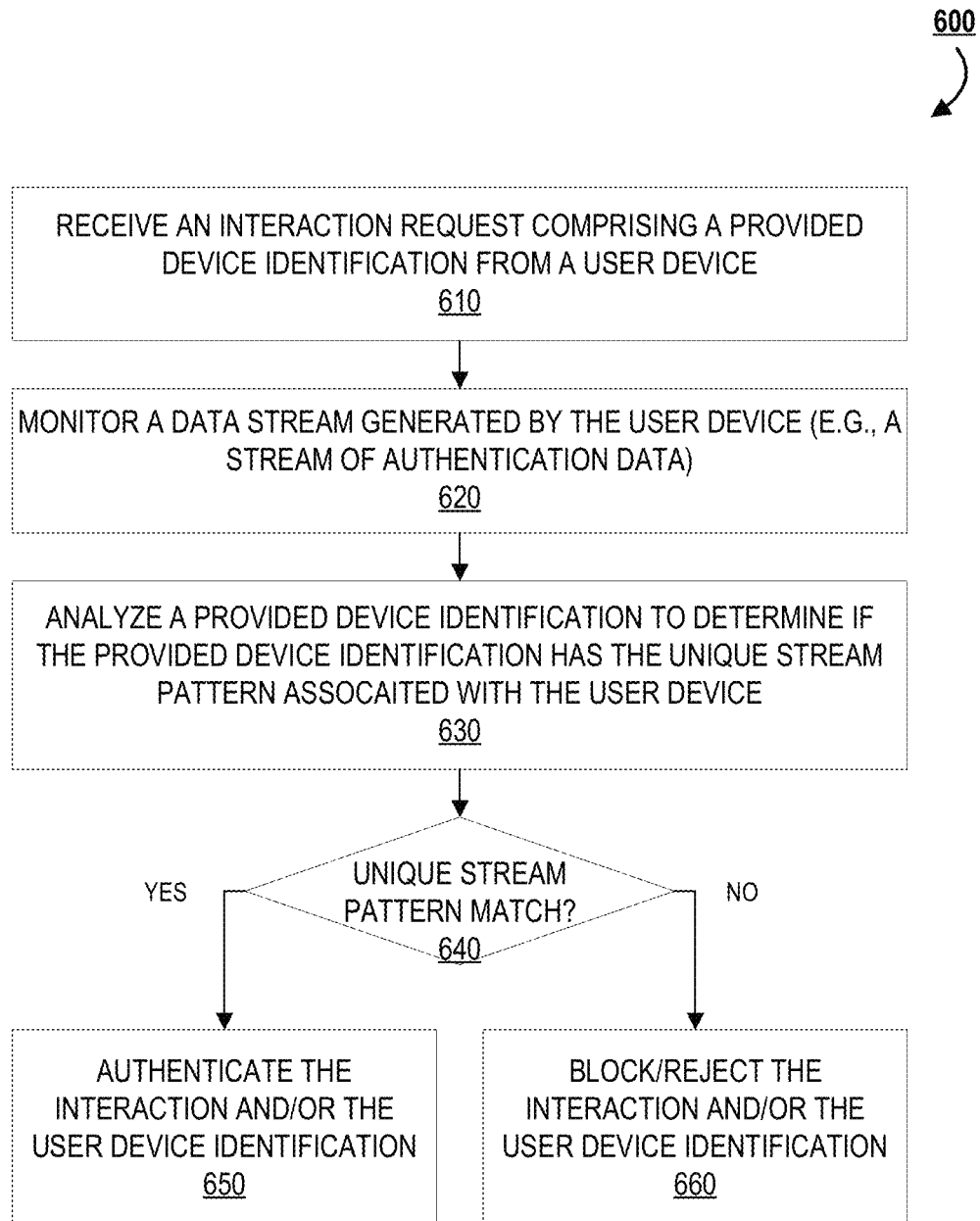

Having thus described embodiments of the invention in general terms, reference will now be made to the accompanying drawings, wherein:

FIG. 1 provides an encrypted identification and authentication system environment, in accordance with one embodiment of the invention;

FIG. 2 provides a block diagram of a user device, in accordance with one embodiment of the invention;

FIG. 3 provides a block diagram of an encrypted authentication system, in accordance with one embodiment of the invention;

FIG. 4 provides a block diagram of an entity system, in accordance with one embodiment of the invention;

FIG. 5 provides a high level process flow for identifying encrypted device identification, in accordance with one embodiment of the invention; and FIG. 6 provides a high level process flow for authenticating an interaction based on monitoring an encrypted device identification, in accordance with one embodiment of the invention.

DETAILED DESCRIPTION OF EMBODIMENTS OF THE INVENTION

Embodiments of the invention, as described herein, leverage artificial intelligence, machine-learning, and/or other complex, specific-use computer system to provide a novel approach for device and/or user identification and authentication. While being configured to prevent attempted unauthorized access in general, the authentication systems and methods described herein are further resistant to or immune to attempted unauthorized access attacks that employ quantum computing technology or techniques. The system of the present invention is configured to identify encrypted device identifications of particular devices by monitoring and analyzing a data stream generated by the devices for unique stream patterns that may be used to distinguish and reliably identify the particular devices. By accurately and reliably confirming an identity of a device and/or associated user, the system may securely authenticate the identity and/or any associated interactions involved with the device and/or user.

While current methods for authentication typically rely on private-public key pairs for confirming a device and/or user identity, unauthorized access attempts may apply new or modern technologies (e.g., quantum computing) to expose and circumvent these known authentication methods. Specifically, the application of quantum computing to unauthorized access attempts allows for near-instantaneous factoring of large numbers, where given a public key, a private key could be extracted with little effort, thereby breaking or disrupting normal operation of private-public keys for reliable authentication. As such, the present invention addresses the susceptibility of traditional authentication methods by providing an improved, variable stream of authentication information produced and tied to a particular user device that may be used to distinguish, reliably identify, and authenticate the device. In a specific embodiment, during an interaction, devices of the system are configured to generate time-dependent, random number streams having unique stream patterns for accurately identifying and authenticating the particular devices. As a continual, complex series of specifically patterned authentication information is generated by the system over time, an unauthorized access attempt would be identified and prevented even if a single identification number from the stream were to be acquired through unauthorized access techniques at a point in time. Furthermore, as the stream is time-dependent, an unauthorized access attempt providing a past series or string of identification numbers would also be denied by the system.

In some embodiments, the invention trains machine learning models and/or neural networks with an authentication data stream generated by a device so that the machine learning model and/or neural network may learn and identify a unique stream pattern of the data stream. This training may be copied or distributed to additional models and/or devices to allow for those models and/or devices to authenticate the identity of the device and/or user associated with the data stream (i.e., during an interaction). In some embodiments, the invention leverages transfer learning techniques to train machine models. By leveraging transfer learning techniques, computer resources (e.g., learning time, processing power, memory usage, network bandwidth, etc.) required for training may be significantly reduced thereby improving the functioning efficiency of the system as a whole.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the encrypted identification and authentication system. In some embodiments, a user may be a computing device user, a phone user, a mobile device application user, a customer of an entity or business, a system operator, and/or employee of an entity (e.g., a financial institution). In one embodiment, a user may be a customer accessing a user account via an associated user device, wherein data from an interaction between the user and another user and/or entity is monitored, analyzed, and/or processed by the system. In a specific embodiment, a user is a requestor of an interaction or transaction with another user or entity, wherein the user is attempting to authenticate an identity associated with the user. In another embodiment, a user may be an unauthorized user attempting to impersonate or take-over an identity associated with an authorized user. In one embodiment, a user may be an unauthorized user or group attempting to access an account without authorization (e.g., misappropriation). In some embodiments, identities of a user may include authentication information such as a static or variable key or number. In some embodiments, identities of an individual may further include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, automated teller machines (ATMs), or any combination of the aforementioned. The device may be used by the user to access the system directly or through an application, online portal, internet browser, virtual private network, or other connection channel.

As used herein, the term "entity" may be used to include any organization or collection of users that may interact with the encrypted identification and authentication system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to authenticate an identify a user and/or a user device. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with a device and/or account) and determine that the user has authority to access an account or system or otherwise execute an interaction. In some embodiments, the system may be owned or operated by an entity. In such embodiments, the entity may employ additional computer systems, such as authentication servers, to validate and certify resources inputted by the plurality of users within the system. In one embodiment, authentication information may be used without authorization of a user in an attempt to authenticate an unauthorized user without the authorized user knowing (e.g., unauthorized access). As used herein, "authentication information" may further refer to any information generated actively or passively by the system or a device of the system (e.g., a user device) that may be used by the system to authenticate an identity of a user and/or an associated user device. In a specific example, authentication information may include device information associated with a user device (e.g., serial number, product number, device component numbers, etc.). In another specific example, authentication information by further include data generated by the device or a specific data generating component of the device (e.g., a random number generator) for the purpose of accurately authenticating an identity of the device and/or an associated user. In one embodiment, a data generating component may be a hardware and/or software component installed on a user device for the specific purpose of authenticating the device and/or associated user identity. In another embodiment, non-specific-use data may be leveraged and/or transformed by the system to uniquely authenticate an identity of a particular device and/or user. For example, data associated with collected and/or emitted electromagnetic radiation (e.g., radio waves, ambient and/or produced light, etc.) may be used as authentication information.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system may be configured to reach out to the data source and watch, observe, or check the data source for changes, updates, variations, patterns, and the like. In other embodiments, a system may passively monitor a data source or data stream, wherein the data source or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise monitoring a data stream of encrypted authentication information during an interaction. In another specific embodiment, monitoring may comprise determining a match between incoming data patterns and known data patterns to identify unauthorized data access and/or potential misappropriation.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity. In a specific embodiment, an interaction may comprise a transaction or exchange of resources (e.g., funds or data (i.e., files)) between devices either directly or via an intermediate system (e.g., an entity system and/or the encrypted authentication system described below). In another specific embodiment, an interaction may comprise a submission of a bid to an auction or exchange.

FIG. 1 provides an encrypted identification and authentication system environment 100, in accordance with one embodiment of the invention. As illustrated in FIG. 1, encrypted authentication system 130 is operatively coupled, via a network 101, to the user device(s) 110 (e.g., a plurality of user devices 110a-110d) and the entity system(s) 120. In this way, the encrypted authentication system 130 can send information to and receive information from the user device 110 and the entity system 120. In the illustrated embodiment, the plurality of user devices 110a-110d provide a plurality of communication channels through which the entity system 120 and/or the encrypted authentication system 130 may communicate with the user 102 over the network 101.

In the illustrated embodiment, the encrypted authentication system 130 further comprises an artificial intelligence (AI) system 130a and a machine learning system 130b which may be separate systems operating together with the encrypted authentication system 130 or integrated within the encrypted authentication system 130.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more entity systems 120 and/or other user devices via a user device 110 while a data stream or flow between the user device 110 and the entity system 120 and/or other user devices is intercepted and monitored by the encrypted authentication system 130 over the network 101. In some embodiments a user 102 is a user requesting service from the entity or interacting with an account maintained by the entity system 120. In an alternative embodiment, the user 102 is an individual interacting with the encrypted authentication system 130 over the network 101 and monitoring input of information from the entity systems 120 to and from the encrypted authentication system 130 for processing and analysis (e.g., an employee of the entity operating and/or monitoring the systems 120, 130). In another specific embodiment, the user 102 in an individual interacting with another user to complete an interaction or transaction between the two user. For example, the interaction may be executed between user devices 110 of the two users directly. In an alternative example, the interaction may be processed through another system such as entity system 120 and/or encrypted authentication system 130.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a light emission device 250 such as a flashlight, a visual capture device such as a camera 216, a positioning system device 242, such as a geo-positioning system device like a GPS device, an accelerometer, and the like. In one embodiment, the camera 216 may include a scanner, barcode reader, or any other image capturing device or sensor configured to capture an image or collect light or other electromagnetic radiation. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238 and an encrypted identification generator 248. In some embodiments, the user application 238 allows a user 102 to access and/or interact with other systems such as the entity system 120. In some embodiments, the user is a customer of a financial entity and the user application 238 is a resource management application providing access to a resource location maintained by the entity system 120 wherein the user may interact with a resource location via a user interface of the user application 238. In one embodiment, the user application 238 may be configured to allow a user 102 to request, initiate, and/or receive an interaction with another device or system. In some embodiments, the encrypted identification generator 248 may be installed in the memory 234 of the user device 110. The encrypted identification generator 248 may be configured to generate either actively or passively a stream of encrypted identification information for authenticating the user device 110 and/or an associated user 102. In a specific embodiment, the encrypted identification generator 248 comprises a random number generator or a pseudorandom number generator. In another specific embodiment, the encrypted identification generator 248 may be configured to generate a time-dependent data stream having a unique stream pattern which may be used to distinguish and identify the particular generator 248 and/or data stream.

The processing device 202 may be configured to use the communication device 224 to communicate with one or more other devices on a network 101 such as, but not limited to the entity system 120 and the record tracking system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, 248, are loaded into the temporary memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

FIG. 3 provides a block diagram of an encrypted authentication system 130, in accordance with one embodiment of the invention. The encrypted authentication system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the encrypted authentication system 130, in order to interface and manage data flow between systems while executing commands to control the systems. In some embodiments, the controller 301 may be integrated into or be placed in one or more of the systems described herein. In other embodiments, the controller 301 may be a separate system or device. In some embodiments, the controller 301 may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the encrypted authentication system 130 comprises computer-readable instructions 310 stored in the memory device 306, which in one embodiment includes the computer-readable instructions 310 of an encrypted identification generator 312, an encrypted authentication application 320, and an artificial intelligence application 314 which further comprises a machine learning and/or neural network engine. The encrypted identification generator 312 may be installed in either or both of the user device 110 and/or the encrypted authentication system 130 in various embodiments of the invention as illustrated in the figures. As previously discussed, the encrypted identification generator 312 may be configured to generate either actively or passively a stream of encrypted identification information for authenticating a device and/or an associated user. In a specific embodiment, the encrypted identification generator 312 comprises a random number generator or a pseudorandom number generator. In another specific embodiment, the encrypted identification generator 312 may be configured to generate a time-dependent data stream having a unique stream pattern which may be used to distinguish and identify the particular generator 312 and/or data stream. In another specific embodiment, the encrypted authentication system 130 may be configured to install the encrypted identification generator 312 or an output of the generator 312 (e.g., pattern training) on another device (e.g., user device 110). In some embodiments, the encrypted authentication application 320 may be configured to receive an encrypted identification (e.g., a data stream) from another device in order to authenticate the another device and/or associated user based on an analysis of the data stream for distinguishable or unique stream patterns. In another embodiment, the encrypted authentication application 320 may be configured to train machine learning models (e.g., machine learning models 328) and/or other devices with a data stream to identify a unique stream pattern of the data stream. In another embodiment, the encrypted authentication application 320 may be configured to distribute or copy a trained pattern to other devices (e.g., other user devices). In one embodiment, the artificial intelligence application 322 and machine learning engine may be utilized by the encrypted authentication application 320 and/or the encrypted identification generator 312 to monitor and analyze a generated data stream to distinguish learn and/or identify unique stream patterns for device and/or associated user authentication.

In some embodiments, the memory device 306 includes data storage 308 for storing data related to the system environment, but not limited to data created and/or used by the encrypted identification generator 312, encrypted authentication application 320, and the artificial intelligence application and machine learning engine 322. Data stored in the data storage 308 may comprise a user information database 314, an identification database 316, and one or more machine learning models 328.

The user information database 314 is used to store information and data associated with one or more users and/or user devices as described herein. In some embodiments, the user information database 314 may include user identifying information, user account information, user interaction information (e.g., historical interactions, account actions or events, transactions, communications, inputs), user device information, and the like.

The identification database 316 is used to store information regarding known encrypted identifications of authorized user devices and/or associated users. For example, the identification database 316 may include previously identified unique stream patterns associated with one or more encrypted identification generators of a user device. The identification database 316 may include authentication information such as one or more patterns, look-up tables, tokens, hashes, or the like for identifying a particular device and/or associated user. The system may be configured to access and update stored information and data stored in the identification database 316 as additional information is collected.

In one embodiment of the invention, the encrypted authentication system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the encrypted authentication system 130 may include multiple systems, servers, computers or the like maintained by one or many entities. In some embodiments, the encrypted authentication system 130 may be part of the entity systems 120. In other embodiments, the entity systems 120 are distinct from the encrypted authentication system 130. The encrypted authentication system 130 may communicate with the entity systems 120 via a secure connection generated for secure encrypted communications between the two systems either over the network 101 or alternative to the network 101.

As illustrated in detail in FIG. 4, the environment 100 further includes one or more entity systems 120 which are connected to the user device 110 and the encrypted authentication system 130. The entity systems 120 may be associated with one or more entities, institutions or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the encrypted authentication system 130 to provide access to accounts and resources stored and maintained on the entity systems 120. In some embodiments, the entity system 120 may communicate with the encrypted authentication system 130 during an interaction with a user 102 in real-time, wherein user interactions may be monitored and processed by the encrypted authentication system 130. In some embodiments, data storage 408 comprises user information database 416 and/or interaction database 420 to either supplement or replace similar data storages or databases on the encrypted authentication system 130 as previously discussed.

The systems of the environment 100 may be used to prevent attempted unauthorized access by providing a reliable and secure authentication method. As previously discussed, the system of the present invention is configured to identify encrypted device identifications of particular devices by monitoring and analyzing a data stream generated by the devices for unique stream patterns that may be used to distinguish and reliably identify the particular devices. By accurately and reliably confirming an identity of a device and/or associated user, the system may securely authenticate the identity and/or any associated interactions involved with the device and/or associated user.

FIG. 5 provides a high level process flow for identifying encrypted device identification, in accordance with one embodiment of the invention. As illustrated in block 510 of FIG. 5, the system may first install an encrypted device identification generator on a user device in accordance with some embodiments of the invention. The encrypted device identification generator may be configured to generate an encrypted device identification for identifying and/or authenticating a particular user device and/or an associated user. An encrypted device identification is an output of the generator such as one or more values, numbers, characters, symbols, images, data, or other forms of indicia which may be used to authenticate an identity of the user device and/or associated user. In a specific embodiment, the encrypted device identification is a stream of data (e.g., alphanumeric values) continuously generated by the encrypted device identification generator.

In some embodiments, the encrypted device identification generator may comprise a random number generator, wherein an output encrypted device identification is a stream or sequence of randomly generated values or the like. As used herein, a random number generator may comprise an algorithmic-based random number generator or pseudorandom number generator, wherein a stream or string of numbers or other values are generated by a computational model and meet the requirements of statistical tests for randomness for discernible unpredictability of generated output beyond a predetermined acceptable threshold. In some embodiments, a pseudorandom number generator requires a seed or initial value for input on which the pseudorandom number generation is determined and linked to in order to remain traceable (i.e., back to a specific device and/or user) and characteristic of a particular device. In one embodiment, a seed may comprise hardware-specific information such as a network card identification number, component or device serial number, or the like, wherein the seed may be different or unique for each device. In this way, a data stream generated by the system as described herein may be unique and subtly different, wherein it may be difficult for other observers (e.g., unauthorized users) to readily distinguish a pattern. In some embodiments, the encrypted device identification generator may comprise a combination of pseudorandom number generators (i.e., layered or combined generator output to increase complexity and statistically-determined randomness). In some embodiments, a pseudorandom number generator may further comprise a cryptographic or cryptographically secure pseudorandom number generator configured for suitably random generation of a stream or sequence of values, keys, nonces, or the like. In some embodiments, a data stream or unique stream pattern may be generated using a pseudorandom number generator, wherein the data stream and/or unique stream pattern are not truly random, but wherein the data stream and/or unique stream pattern is statistically random enough to interfere with unauthorized access attempts and discourage attacks.

In other embodiments, the encrypted device identification generator may include hardware or true random number generators where generation of random numbers is based on a physical process and use of a transducer, amplifier, analog-to-digital converter, and/or other electronic circuitry configured for converting an aspect of the physical process to an electrical signal. Non-limiting examples of physical processes that may be used and converted to generate random numbers include atmospheric or environmental monitored noise detected using resistors (e.g., thermal noise), photodetectors or light collection devices (e.g., electromagnetic noise, radioactive decay), and the like. In a specific embodiment, a collection device may be used to monitor a collected signal and/or noise associated with a specific environment in which a collection device is placed. In another specific embodiment, a collection device may be used to monitor a collected signal and/or noise emitted from another device, the collected signal and/or noise being specific and unique to the another device. In one embodiment, a hardware or true random number generator may be used with a pseudorandom number generator, wherein the pseudorandom number generator provides a distinguishable, seed-dependent stream pattern, and wherein the hardware or true random number provides additional complexity while retaining the distinguishable or derivable pattern. In one embodiment, a hardware or true random number generator may be used to generate a seed to be stored for reference and used as input to a pseudorandom number generator.

In some embodiments, the data stream generated by the encrypted device identification generator is time-dependent, wherein devices of the system are configured to generate time-dependent data streams having unique stream patterns for accurately identifying and authenticating the particular devices. As a continual, complex series of specifically patterned authentication information is generated by the system over time, an unauthorized access attempt would be identified and prevented even if a portion from the stream were to be acquired through unauthorized access techniques at a single point in time. Furthermore, as the stream is time-dependent, an unauthorized access attempt providing a past series or string of identification numbers would also be able to be identified and denied by the system. In some embodiments, the data stream may be used in conjunction with a traditional private-public key as an additional, complementary security measure.

In other embodiments, the system may not install an encrypted device identification generator on the user device. Instead, the system may leverage a preexisting or preinstalled component or application of the user device that is configured or has been configured or modified by the system to execute the functions of the encrypted device identification generator. In one embodiment, the system may repurpose a preexisting or conventional component of the user device to generate, for example, a unique stream or string of numbers to act as a device identification specific to the particular user device. For example, the system may extract a portion of a value or number generated by the processing device of the user device (e.g., a stream of bits) while executing another task (e.g., extract a random numeral from a stream of generated values).

In some embodiments, the system may be configured to further modify and obscure a data stream with device-specific information, wherein the data stream is transformed through integration with the device-specific information. Non-limiting examples of device-specific information may include device identification information (e.g., device model numbers, part numbers, serial numbers, or the like), connection identification information, Internet Protocol (IP) addresses, cookies, universally or globally unique identifiers, security tokens, dates, or times.

As illustrated in block 520, the system receives an encrypted device identification associated with the user device and generated by an encrypted device identification generator associated with the user device. In one embodiment, the system is configured to receive a data stream (e.g., a sequence of randomly generated values) generated by the encrypted device identification generator associated with the user device. As illustrated in block 530, the system monitors a data stream generated by the encrypted device identification generator. In one embodiment, the system may receive and monitor a data stream from a user device and/or stream generator as part of an initial provisioning process, wherein the user device is initially identified, authenticated, and characterized by the system for subsequent interactions. In some embodiments, the system may be configured to passively monitor a data stream continuously following an initial provisioning process. In another embodiment, the system may be configured to only receive and monitor a data stream for a predefined amount of time. For example, the system may only receive and monitor the data stream during an interaction with the user device, wherein the system ceases monitoring the data stream upon completion or other termination of the interaction.

As illustrated in block 540, while monitoring the data stream, the system may identify a unique stream pattern associated with the data stream generated by the encrypted device identification generator and used as the device identification. In some embodiments, a unique stream pattern may include distinguishable variations, progressions, repetitions, patterns, permutations, or the like of the generated data stream that are unique to a particular user device. In some embodiments, the system may store an association between a particular device and an associated unique stream pattern in a database (e.g., identification database 316) for reference in subsequent interactions.

As illustrated in block 550, in some embodiments, the system may be configured to store the unique stream pattern identified while monitoring the data stream in order to later identify the unique stream pattern in subsequent interactions. For example, the encrypted authentication system 130 may store a unique stream pattern in a storage location or database such as identification database 316 of FIG. 3. In one embodiment, storing the unique stream pattern identified while monitoring the data stream comprises training a machine learning model using the monitored data stream to identify the unique stream pattern. In this way, the machine learning models may be trained and configured to accurately identify and authenticate the user device and/or associated user during subsequent interactions involving said user device and/or associated user. By distributing the training to accurately identify the user device, the system enables other devices or system receiving the training to authenticate the user device in subsequent interactions without an intervening party or entity. In one embodiment, the system is configured to train other user devices to identify a unique stream pattern of another device. In this way, interactions may be independent authenticated and executed between user device directly.

In one embodiment, the system leverages transfer learning techniques to train machine learning models to identify unique stream patterns in a particular data stream. The transfer learning techniques may include reusing a previously developed or pretrained model and further tuning the model for the newly adapted task. In one embodiment, the machine learning model may be configured to be trained to identify various stream patterns for different devices, wherein a previous model is reused as a basis for a subsequent training. In a specific example, a device may include a machine learning model configured to be trained to identify and authenticate authorized user devices during interactions with said authorized devices, i.e., the model is reused and retrained with each interaction involving a new device. By leveraging transfer learning techniques, computer resources (e.g., learning time, processing power, memory usage, network bandwidth, etc.) required for training may be significantly reduced thereby improving the functioning efficiency of the device and the system as a whole.

FIG. 6 provides a high level process flow for authenticating an interaction based on monitoring an encrypted device identification, in accordance with one embodiment of the invention. As illustrated in block 610 of FIG. 6, the system receives an interaction request comprising a provided device identification from a user device. In one embodiment, the user device providing the device identification is the requestor of the interaction, wherein the requesting user device identity and/or associated user must be authenticated by the system. The interaction request from the requesting user may include authentication information provided by the requesting user and/or an associated user device. The provided authentication information may include an encrypted device identification which may comprise a stream of generated data used for authentication (e.g., a randomly generated number stream). In some embodiments, an interaction request may include a user logging in or otherwise attempting to authenticate the user's identity to access an account of the user (e.g., a financial account) on a user device. In another embodiment an interaction request may include a request to exchange resources or funds with a second user device and associated second user.

Upon receiving the interaction request, as illustrated in block 620, the system may monitor a data stream generated by the first user device. In one embodiment, the data stream is a data stream used to authenticate an identity of the first user device and/or associated user. As illustrated in block 630, the system analyzes the provided device identification to determine if the provided device identification comprises the same unique stream pattern known to be associated with the requesting user device. In one embodiment, a unique stream pattern is identified and established as being associated with a particular user device and/or user during a previous interaction with the system such as described in the process flow illustrated in FIG. 5. This established unique stream pattern may be stored by the system for later comparison and authentication.

In block 640, the system attempts to match a known unique stream pattern to the provided device identification. The data stream associated with the pending interaction request and the provided device identification is monitored to determine one or more characteristics such as a stream pattern. If a match is confirmed and the identity of the requesting user and/or associated device is confirmed, the process continues to block 650, wherein the system may authenticate the requested interaction and/or identity of the user device and/or associated user.

If the system does not match the unique stream pattern to the provided device identification, the process continues to block 660, wherein the system may be configured to block or reject the requested interaction, user device, and/or associated user. In some embodiments, an unsuccessful match may indicate attempted unauthorized access and misappropriation. In response to determining a non-match, in some embodiments, the system may be configured to flag the rejected device and/or user identity as attempted unauthorized access for future interaction requests.

In a specific embodiment of the invention, an encrypted device identification comprising a data stream may be generated using a physical component such as electromagnetic radiation emission or light. In one embodiment, a user device is configured to generate or emit electromagnetic radiation such as radio waves or light to transmit an encrypted device identification particular to the user device. In the specific embodiment, wherein the user device emits light (e.g., via a display device (i.e., screen), a flashlight, or the like), the transmitted light from the user device and/or environmental light sources, when collected by another device, may act as a unique signature for a specific user device, wherein the collected light may be used as an authentication data stream having a unique stream pattern for the emitting user device. It should be understood that the physical component of the encrypted device identification is not limited to electromagnetic radiation emissions but may also include sounds (e.g., produced via a speaker), vibrations (e.g., produced via a motor and collected via an accelerometer).

In a specific example, a first user device having previously established a unique stream pattern of a light emitting device with the system may request an interaction with a second user device. The second user device may be trained by the system to identify the unique stream pattern of the first user device. The first user device emits a signature light emission to be collected by the second user device. The second user device having been configured by the system, may identify and confirm the unique stream pattern from the signature light emission of the first user device in order to authenticate the identity of the first user device and/or the associated first user.

In another specific example, a user having an account with a financial entity may interact with an ATM during an interaction, e.g., a withdrawal of resources or funds. The user having an existing account with the entity may have been required to establish an encrypted device identification as described herein for interactions. In order to authenticate the identity of the user requesting the withdrawal, the ATM may be trained by the system to identify a unique stream pattern from a data stream transmitted by the user's device (e.g., a mobile phone) and having means for receiving said stream (e.g., an antenna, camera, photodetector, barcode reader, near-field communication device, or the like). The ATM may be configured to process the interaction and deliver the requested resource only after authenticating the user and/or associated user device of the requestor using the unique stream pattern and the system and methods described herein.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with encrypted identification and authentication and also preventing unauthorized access.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for encrypted identification and authentication, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating an encrypted device identity, the system comprising:
   a memory device with computer-readable program code stored thereon;
   a communication device connected to a network; and
   a processing device, wherein the processing device is configured to execute the computer-readable program code to:
      during an initial provisioning process for a user device, identify and authenticate the user device;
      during the initial provisioning process, monitor a first data stream from the user device, wherein the first data stream is continuously generated by a pseudorandom number generator based on hardware-specific information of the user device;

while monitoring the first data stream, identify a unique stream pattern of the first data stream, wherein the unique stream pattern is at least one of a variation, progression, repetition, pattern, or permutation of the first data stream;

store, in a database comprising previously identified unique stream patterns associated with user devices, an association between the user device and the unique stream pattern;

receive, from a requesting user device, an interaction request comprising a provided device identification associated with the user device;

monitor a second data stream from the requesting user device;

analyze the second data stream to determine, based on the database, if the second data stream has the unique stream pattern; and based on determining that the second data stream has the unique stream pattern, authenticate the interaction request.

2. The system of claim 1, wherein the user device is a first user device, and wherein the processing device is further configured to execute the computer-readable program code to distribute an identification of the unique stream pattern to a second user device, wherein the second user device is configured to authenticate the interaction request based on the identification of the unique stream pattern.

3. The system of claim 2, wherein distributing the identification of the unique stream pattern further comprises training the second user device to identify the unique stream pattern.

4. The system of claim 1, wherein the processing device is configured to execute the computer-readable program code to:

train a machine learning model to identify unique stream patterns in data streams; and when identifying the unique stream pattern of the first data stream, identify the unique stream pattern of the first data stream using the machine learning model.

5. The system of claim 4, wherein training the machine learning model comprises leveraging transfer learning techniques to reuse and retrain a preexisting machine learning model.

6. The system of claim 1, wherein the pseudorandom number generator is installed on the user device.

7. The system of claim 6, wherein the processing device is further configured to execute the computer-readable program code to install the pseudorandom number generator on the user device.

8. The system of claim 1, wherein the first data stream is time-dependent.

9. The system of claim 1, wherein the first data stream comprises a signature electromagnetic radiation emission emitted by the user device.

10. A computer program product for authenticating an encrypted device identity, wherein the computer program product comprises a non-transitory computer-readable medium comprising computer-readable instructions, the computer-readable instructions, when executed by a processing device, cause the processing device to:

during an initial provisioning process for a user device, identify and authenticate the user device;

during the initial provisioning process, monitor a first data stream from the user device, wherein the first data stream is continuously generated by a pseudorandom number generator based on hardware-specific information of the user device;

while monitoring the first data stream, identify a unique stream pattern of the first data stream, wherein the unique stream pattern is at least one of a variation, progression, repetition, pattern, or permutation of the first data stream;

store, in a database comprising previously identified unique stream patterns associated with user devices, an association between the user device and the unique stream pattern;

receive, from a requesting user device, an interaction request comprising a provided device identification associated with the user device;

monitor a second data stream from the requesting user device;

analyze the second data stream to determine, based on the database, if the second data stream has the unique stream pattern; and based on determining that the second data stream has the unique stream pattern, authenticate the interaction request.

11. The computer program product of claim 10, wherein the user device is a first user device, and wherein the computer-readable instructions, when executed by the processing device, further cause the processing device to distribute an identification of the unique stream pattern to a second user device, wherein the second user device is configured to authenticate the interaction request based on the identification of the unique stream pattern.

12. The computer program product of claim 11, wherein distributing the identification of the unique stream pattern further comprises training the second user device to identify the unique stream pattern.

13. The computer program product of claim 10, wherein the computer-readable instructions, when executed by the processing device, further cause the processing device to:

train a machine learning model to identify unique stream patterns in data streams; and when identifying the unique stream pattern of the first data stream, identify the unique stream pattern of the first data stream using the machine learning model.

14. The computer program product of claim 13, wherein training the machine learning model comprises leveraging transfer learning techniques to reuse and retrain a preexisting machine learning model.

15. The computer program product of claim 10, wherein the pseudorandom number generator is installed on the user device.

16. The computer program product of claim 15, wherein the computer-readable instructions, when executed by the processing device, further cause the processing device to install the pseudorandom number generator on the user device.

17. The computer program product of claim 10, wherein the first data stream is time-dependent.

18. The computer program product of claim 10, wherein the first data stream comprises a signature electromagnetic radiation emission emitted by the user device.

19. A computer-implemented method for authenticating an encrypted device identity, the computer-implemented method comprising:

during an initial provisioning process for a user device, identifying and authenticating the user device;

during the initial provisioning process, monitoring a first data stream from the user device, wherein the first data stream is continuously generated by a pseudorandom number generator based on hardware-specific information of the user device;

while monitoring the first data stream, identifying a unique stream pattern of the first data stream, wherein the unique stream pattern is at least one of a variation, progression, repetition, pattern, or permutation of the first data stream;

storing, in a database comprising previously identified unique stream patterns associated with user devices, an association between the user device and the unique stream pattern;

receiving, from a requesting user device, an interaction request comprising a provided device identification associated with the user device;

monitoring a second data stream from the requesting user device;

analyzing the second data stream to determine, based on the database, if the second data stream has the unique stream pattern; and based on determining that the second data stream has the unique stream pattern, authenticating the interaction request.

20. The computer-implemented method of claim 19, wherein the user device is a first user device, and wherein the computer-implemented method further comprises distributing an identification of the unique stream pattern to a second user device, wherein the second user device is configured to authenticate the interaction request based on the identification of the unique stream pattern.

* * * * *